(12) United States Patent
Wang et al.

(10) Patent No.: US 7,594,392 B2
(45) Date of Patent: Sep. 29, 2009

(54) SYSTEM FOR CONTROLLING ADSORBER REGENERATION

(75) Inventors: Yue-Yun Wang, Troy, MI (US); Sriram Satya Srinivas Popuri, Greenwood, IN (US); Joan M. Wills, Nashville, IN (US)

(73) Assignee: Cummins, Inc., Columbus, IN (US)

( * ) Notice: Subject to any disclaimer, the term of this patent is extended or adjusted under 35 U.S.C. 154(b) by 213 days.

(21) Appl. No.: 11/593,830

(22) Filed: Nov. 7, 2006

(65) Prior Publication Data

US 2008/0109146 A1 May 8, 2008

(51) Int. Cl.
*F01N 3/00* (2006.01)
(52) U.S. Cl. ............................ 60/285; 60/274; 60/276; 60/295; 60/297
(58) Field of Classification Search ................... 60/274, 60/276, 285, 286, 295, 297
See application file for complete search history.

(56) References Cited

U.S. PATENT DOCUMENTS

| | | | |
|---|---|---|---|
| 4,222,236 A | 9/1980 | Hegedus et al. | |
| 5,473,887 A | 12/1995 | Takeshima et al. | |
| 5,529,048 A | 6/1996 | Kurihara et al. | |
| 5,531,203 A | 7/1996 | Komatsuda et al. | |
| 5,600,947 A | 2/1997 | Cullen | |
| 5,635,142 A | 6/1997 | Ichiki et al. | |
| 5,743,084 A | 4/1998 | Hepburn | |
| 5,746,049 A * | 5/1998 | Cullen et al. | 60/274 |
| 5,758,490 A * | 6/1998 | Maki et al. | 60/274 |
| 5,778,666 A * | 7/1998 | Cullen et al. | 60/274 |
| 5,784,879 A | 7/1998 | Dohta et al. | |
| 5,878,567 A | 3/1999 | Adamczyk, Jr. et al. | |
| 5,894,725 A | 4/1999 | Cullen et al. | |
| 5,910,293 A * | 6/1999 | Hemingway et al. | 423/213.7 |
| 5,915,359 A | 6/1999 | Meyer et al. | |
| 5,983,627 A * | 11/1999 | Asik | 60/274 |
| 6,185,935 B1 | 2/2001 | Dickers et al. | |
| 6,199,372 B1 | 3/2001 | Wakamoto | |
| 6,202,406 B1 | 3/2001 | Griffin et al. | |
| 6,205,773 B1 | 3/2001 | Suzuki | |
| 6,212,884 B1 | 4/2001 | Ohuchi et al. | |
| 6,216,449 B1 | 4/2001 | Strehlau et al. | |
| 6,244,046 B1 | 6/2001 | Yamashita | |
| 6,266,957 B1 | 7/2001 | Nozawa et al. | |
| 6,272,848 B1 | 8/2001 | Okude et al. | |
| 6,308,515 B1 | 10/2001 | Bidner et al. | |
| 6,311,482 B1 | 11/2001 | Yamashita | |
| 6,318,075 B1 | 11/2001 | Gunther et al. | |
| 6,327,847 B1 | 12/2001 | Surnilla et al. | |
| 6,327,848 B1 | 12/2001 | Poggio et al. | |
| 6,345,498 B2 | 2/2002 | Yonekura et al. | |
| 6,360,530 B1 | 3/2002 | Robichaux et al. | |

(Continued)

*Primary Examiner*—Binh Q Tran
(74) *Attorney, Agent, or Firm*—Krieg DeVault LLP

(57) ABSTRACT

A system, method, and software for regenerating an adsorber connected with a flow of exhaust from an engine. An open-loop control module for ramping up and maintaining a temperature value of an adsorber to a regeneration temperature value by controlling an air fuel ratio value of an engine to operate at an open-loop controlled variable duty cycle. A closed-loop control module is operable to take control from the open-loop control module to maintain the adsorber at the regeneration temperature value if the temperature value of the adsorber deviates from the regeneration temperature value by controlling the air fuel ratio value of the engine to operate at a closed-loop controlled variable duty cycle.

36 Claims, 7 Drawing Sheets

U.S. PATENT DOCUMENTS

| | | |
|---|---|---|
| 6,370,868 B1 | 4/2002 | Kolmanovsky et al. |
| 6,374,597 B1 | 4/2002 | Bidner et al. |
| 6,389,802 B1 | 5/2002 | Berger et al. |
| 6,401,454 B2 | 6/2002 | Takano et al. |
| 6,408,620 B2 | 6/2002 | Boegner et al. |
| 6,422,003 B1 | 7/2002 | Ament et al. |
| 6,427,439 B1 | 8/2002 | Xu et al. |
| 6,434,928 B1 | 8/2002 | Manaka |
| 6,438,944 B1 | 8/2002 | Bidner et al. |
| 6,451,602 B1 | 9/2002 | Popoff et al. |
| 6,453,662 B1 * | 9/2002 | Lewis et al. .................... 60/277 |
| 6,453,663 B1 | 9/2002 | Orzel et al. |
| 6,453,664 B2 | 9/2002 | Ishii et al. |
| 6,463,733 B1 | 10/2002 | Asik et al. |
| 6,467,259 B1 | 10/2002 | Surnilla et al. |
| 6,477,832 B1 | 11/2002 | Surnilla et al. |
| 6,481,199 B1 | 11/2002 | Bidner et al. |
| 6,487,849 B1 | 12/2002 | Bidner et al. |
| 6,487,850 B1 | 12/2002 | Bidner et al. |
| 6,490,858 B2 | 12/2002 | Barrett et al. |
| 6,490,860 B1 | 12/2002 | Farmer et al. |
| 6,497,092 B1 | 12/2002 | Theis |
| 6,502,387 B1 | 1/2003 | Asik et al. |
| 6,502,391 B1 | 1/2003 | Hirota et al. |
| 6,513,319 B2 | 2/2003 | Nozawa et al. |
| 6,513,322 B2 | 2/2003 | Ohuchi et al. |
| 6,531,099 B1 | 3/2003 | Held |
| 6,562,753 B2 | 5/2003 | Miyoshi et al. |
| 6,568,177 B1 | 5/2003 | Surnilla |
| 6,588,205 B1 | 7/2003 | Kumagai et al. |
| 6,594,990 B2 | 7/2003 | Kuenstler et al. |
| 6,615,577 B2 | 9/2003 | Meyer et al. |
| 6,644,021 B2 | 11/2003 | Okada et al. |
| 6,651,422 B1 | 11/2003 | LeGare |
| 6,688,101 B2 | 2/2004 | Isobe et al. |
| 6,766,642 B2 | 7/2004 | Binder et al. |
| 6,792,346 B2 | 9/2004 | Takebayashi et al. |
| 6,813,879 B2 | 11/2004 | Watner et al. |
| 6,813,882 B2 | 11/2004 | Hepburn et al. |
| 6,823,658 B2 | 11/2004 | Kuroda et al. |
| 6,823,664 B2 | 11/2004 | Nakatani et al. |
| 6,823,665 B2 | 11/2004 | Hirota et al. |
| 6,829,888 B2 | 12/2004 | Kuenstler et al. |
| 6,871,492 B2 | 3/2005 | Huynh et al. |
| 6,889,497 B2 | 5/2005 | Schnaibel et al. |
| 6,901,749 B2 | 6/2005 | Hashimoto |
| 6,941,748 B2 | 9/2005 | Pott et al. |
| 6,962,045 B2 | 11/2005 | Kitahara et al. |
| 6,990,799 B2 | 1/2006 | Bidner et al. |
| 7,111,450 B2 * | 9/2006 | Surnilla ....................... 60/285 |
| 7,121,086 B2 | 10/2006 | Nishii et al. |
| 7,134,274 B2 | 11/2006 | Asanuma |
| 2001/0007191 A1 | 7/2001 | Ohuchi et al. |
| 2001/0010149 A1 | 8/2001 | Ishii et al. |
| 2001/0013223 A1 | 8/2001 | Boegner et al. |
| 2001/0032456 A1 | 10/2001 | Yonekura et al. |
| 2001/0035008 A1 | 11/2001 | Nozawa et al. |
| 2002/0056268 A1 | 5/2002 | Isobe et al. |
| 2002/0073696 A1 | 6/2002 | Kuenstler et al. |
| 2002/0141908 A1 | 10/2002 | Miyoshi et al. |
| 2002/0170287 A1 | 11/2002 | Hirota et al. |
| 2002/0178716 A1 | 12/2002 | Hpeburn et al. |
| 2002/0189235 A1 | 12/2002 | Meyer et al. |
| 2002/0189580 A1 | 12/2002 | Surnilla et al. |
| 2003/0000205 A1 | 1/2003 | Lewis et al. |
| 2003/0037541 A1 | 2/2003 | Farmer et al. |
| 2003/0056497 A1 | 3/2003 | Kuenstler et al. |
| 2003/0056499 A1 | 3/2003 | Binder et al. |
| 2003/0101713 A1 | 6/2003 | Dalla Betta et al. |
| 2003/0106306 A1 | 6/2003 | Nakatani et al. |
| 2003/0106307 A1 | 6/2003 | Okada et al. |
| 2003/0131591 A1 | 7/2003 | Pott et al. |
| 2003/0134425 A1 | 7/2003 | Ceccarini et al. |
| 2003/0177761 A1 | 9/2003 | Wagner et al. |
| 2003/0212484 A1 | 11/2003 | Takebayashi et al. |
| 2003/0213235 A1 | 11/2003 | Kitahara et al. |
| 2004/0003587 A1 | 1/2004 | Sakai |
| 2006/0137327 A1 | 6/2006 | Shirakawa et al. |

* cited by examiner

SYSTEM FOR CONTROLLING ADSORBER REGENERATION

BACKGROUND

The present invention relates generally to exhaust treatment for an internal combustion engine and more particularly, but not exclusively, to a method, system, and software utilized to provide reductant to perform desulfurization ("de-$SO_x$") to regenerate a $NO_x$ adsorber.

The Environmental Protection Agency ("EPA") is working aggressively to reduce pollution from new, heavy-duty diesel trucks and buses by requiring them to meet tougher emission standards that will make new heavy-duty vehicles up to 95% cleaner than older vehicles. Emission filters in the exhaust gas systems of internal combustion engines are used to remove unburned soot particles from the exhaust gas and to convert harmful pollutants such as hydrocarbons ("HC"), carbon monoxide ("CO"), oxides of nitrogen ("$NO_x$"), and oxides of sulfur ("$SO_x$") into harmless gases.

Exhaust gas is passed through a catalytic converter that is typically located between the engine and the muffler. In operation, the exhaust gases pass over one or more large surface areas that may be coated with a particular type of catalyst. A catalyst is a material that causes a chemical reaction to proceed at a usually faster rate without becoming part of the reaction process. The catalyst is not changed during the reaction process but rather converts the harmful pollutants into substances or gases that are not harmful to the environment.

$NO_x$ storage catalyst units or adsorbers are used to purify exhaust gases of combustion engines. These $NO_x$ storage catalyst units, in addition to storing or trapping $NO_x$, also trap and store unwanted $SO_x$ in the form of sulfates. The adsorption of $SO_x$ in the converter reduces the storage capacity of the adsorber and the catalytically active surface area of the catalyst. As such, $NO_x$ storage catalyst units must be regenerated to remove both $NO_x$ and $SO_x$. The process of regenerating $NO_x$ adsorbers varies depending on whether operating in a de-$NO_x$ mode (in which $NO_x$ is converted and removed from the unit) or a de-$SO_x$ mode (in which the unit is ran through a de-$SO_x$ process). Accordingly, there is a need for methods, systems and software for controlling an engine to place a $NO_x$ adsorber through a de-$SO_x$ process.

SUMMARY

One embodiment according to the present invention discloses a unique engine management system for controlling a regeneration process of an adsorber. Other embodiments include unique apparatuses, systems, devices, hardware, software, methods, and combinations of these for controlling a de-$SO_x$ process of an adsorber utilized to convert harmful pollutants formed as a byproduct of the combustion process in an internal combustion engine into non-harmful substances. Further embodiments, forms, objects, features, advantages, aspects, and benefits of the present invention shall become apparent from the following description and drawings.

DETAILED DESCRIPTION OF ILLUSTRATIVE EMBODIMENTS

Figure 1:
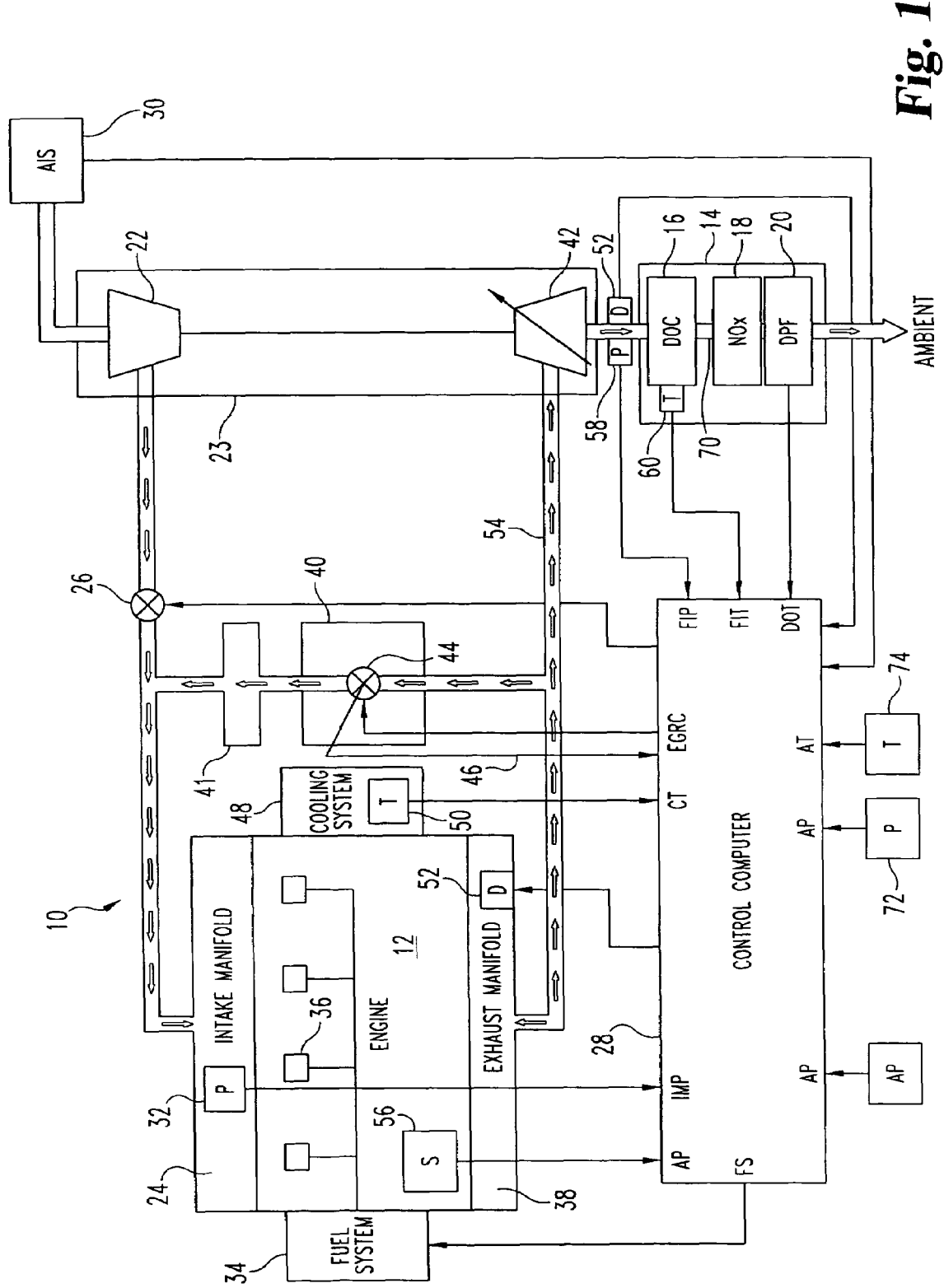
FIG. 1 is a schematic of a representative diesel engine system.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention is illustrated therein being contemplated as would normally occur to one skilled in the art to which the invention relates.

With reference to FIG. 1, there is illustrated, schematically, a system 10 that includes an internal combustion engine 12 operatively coupled with an exhaust filtration system 14. The exhaust filtration system 14 includes a diesel oxidation catalyst ("DOC") unit 16, a $NO_x$ adsorber or Lean $NO_x$ trap ("LNT") 18, and a diesel particulate filter ("DPF") 20. The exhaust filtration system 14 is operable to remove unwanted pollutants from exhaust gas exiting the engine 12 after the combustion process.

The DOC unit 16 is a flow through device that consists of a canister that may contain a honey-comb like structure or substrate. The substrate has a large surface area that is coated with an active catalyst layer. This layer may contain a small, well dispersed amount of precious metals such as, for example, platinum or palladium. As exhaust gas from the engine 12 traverses the catalyst, CO, gaseous HC and liquid HC particles (unburned fuel and oil) are oxidized, thereby reducing harmful emissions. The result of this process is that these pollutants are converted to carbon dioxide and water. In order to function properly, the DOC unit 16 must be heated to a minimum temperature value.

The $NO_x$ adsorber 18 is operable to absorb $NO_x$ created during the combustion process of the engine 12, thereby dramatically reducing the amount of $NO_x$ released into the atmosphere. The $NO_x$ adsorber 18 contains a catalyst that allows $NO_x$ to adsorb onto the catalyst. A byproduct of running the engine 12 in a lean mode is the production of harmful $NO_x$. The $NO_x$ adsorber 18 stores or absorbs $NO_x$ under lean engine operating conditions (lambda>1) and releases and catalytically reduces the stored $NO_x$ under rich engine operating conditions (lambda<1).

Under $NO_x$ regeneration, when the engine is operating under a rich condition at a predetermined temperature range, a catalytic reaction occurs. The stored $NO_x$ is catalytically converted to nitrogen ("$N_2$") and released from the $NO_x$ adsorber 18 thereby regenerating the $NO_x$ adsorber 18. The $NO_x$ adsorber 18 also has a high affinity for trapping sulfur and desulfation or de-$SO_x$, the process for the removal of stored sulfur from the $NO_x$ adsorber 18, also requires rich engine operation, but for a longer period of time and at much higher temperatures.

The DPF 20 may comprise one of several type of particle filters known and used in the art. The DPF 20 is utilized to capture unwanted diesel particulate matter ("DPM") from the flow of exhaust gas exiting the engine 12. DPM is sub-micron size particles found in diesel exhaust. DPM is composed of both solid and liquid particles and is generally classified into three fractions: (1) inorganic carbon (soot), (2) organic fraction (often referred to as SOF or VOF), and (3) sulfate fraction (hydrated sulfuric acid). The DPF 20 may be regenerated at regular intervals by combusting the particulates collected in the DPF 20 through exhaust manipulation or the like. Those skilled in the art would appreciate that, as it relates to the present invention, several different types of DPFs may be utilized in the present invention.

During engine operation, ambient air is inducted from the atmosphere and compressed by a compressor 22 of a turbocharger 23 before being supplied to the engine 12. The compressed air is supplied to the engine 12 through an intake manifold 24 that is connected with the engine 12. An air intake throttle valve 26 is positioned between the compressor 22 and the engine 12 that is operable to control the amount of charge air that reaches the engine 12 from the compressor 22. The air intake throttle valve 26 may be connected with, and controlled by, an electronic control unit ("ECU") 28, but may be controlled by other means as well. For the purpose of the present invention, it is important to note that the air intake throttle valve 26 is operable to control the amount of charge air entering the intake manifold 24 via the compressor 22.

An air intake sensor 30 is included either before or after the compressor 22 to monitor the amount of ambient air or charge air being supplied to the intake manifold 24. The air intake sensor 30 may be connected with the ECU 28 and generates electric signals indicative of the amount of charge air flow. An intake manifold pressure sensor 32 is connected with the intake manifold 24. The intake manifold pressure sensor 32 is operative to sense the amount of air pressure in the intake manifold 24, which is indicative of the amount of air flowing or provided to the engine 12. The intake manifold pressure sensor 32 is connected with the ECU 28 and generates electric signals indicative of the pressure value that are sent to the ECU 28.

The system 10 may also include a fuel injection system 34 that is connected with, and controlled by, the ECU 28. The purpose of the fuel injection system 30 is to deliver fuel into the cylinders of the engine 12, while precisely controlling the timing of the fuel injection, fuel atomization, the amount of fuel injected, as well as other parameters. Fuel is injected into the cylinders of the engine 12 through one or more fuel injectors 36 and is burned with charge air received from the intake manifold 24. Various types of fuel injection systems may be utilized in the present invention, including, but not limited to, pump-line-nozzle injection systems, unit injector and unit pump systems, common rail fuel injection systems and so forth.

Exhaust gases produced in each cylinder during combustion leaves the engine 12 through an exhaust manifold 38 connected with the engine 12. A portion of the exhaust gas is communicated to an exhaust gas recirculation ("EGR") system 40 and a portion of the exhaust gas is supplied to a turbine 42. The turbocharger 23 may be a variable geometry turbocharger 23, but other turbochargers may be utilized as well. The EGR system 34 is used to cool down the combustion process by providing a predetermined amount of exhaust gas to the charge air being supplied by the compressor 22. Cooling down the combustion process reduces the amount of $NO_x$ produced during the combustion process. An EGR cooler 41 may be included to further cool the exhaust gas before being supplied to the air intake manifold 22 in combination with the compressed air passing through the air intake throttle valve 26.

The EGR system 40 includes an EGR valve 44 this is positioned in fluid communication with the outlet of the exhaust manifold 38 and the air intake manifold 24. The EGR valve 44 may also be connected to the ECU 28, which is capable of selectively opening and closing the EGR valve 44. The EGR valve 44 may also have incorporated therewith a differential pressure sensor that is operable to sense a pressure change, or delta pressure, across the EGR valve 44. A pressure signal 46 may also be sent to the ECU 44 indicative of the change in pressure across the EGR valve 44. The air intake throttle valve 26 and the EGR system 40, in conjunction with the fuel injection system 34, may be controlled to run the engine 12 in either a rich or lean mode.

As set forth above, the portion of the exhaust gas not communicated to the EGR system 40 is communicated to the turbine 42, which rotates by expansion of gases flowing through the turbine 42. The turbine 42 is connected to the compressor 22 and provides the driving force for the compressor 22 that generates charge air supplied to the air intake manifold 24. Some temperature loss in the exhaust gas typically occurs as the exhaust gas passes through the turbine 42. As the exhaust gas leaves the turbine 42, it is directed to the exhaust filtration system 14, where it is treated before exiting the system 10.

A cooling system 48 may be connected with the engine 12. The cooling system 48 is a liquid cooling system that transfers waste heat out of the block and other internal components of the engine 12. Typically, the cooling system 48 consists of a closed loop similar to that of an automobile engine. Major components of the cooling system include a water pump, radiator or heat exchanger, water jacket (which consists of coolant passages in the block and heads), and a thermostat. As it relates to the present invention, the thermostat 50, which is the only component illustrated in FIG. 1, is connected with the ECU 28. The thermostat 50 is operable to generate a signal that is sent to the ECU 28 that indicates the temperature of the coolant used to cool the engine 12.

The system 10 includes a doser 52 that may be located in the exhaust manifold 38 and/or located downstream of the exhaust manifold 38. The doser 52 may comprise an injector mounted in an exhaust conduit 54. For the depicted embodiment, the agent introduced through the doser 52 is diesel fuel; however, other embodiments are contemplated in which one or more different dosing agents are used in addition to or in lieu of diesel fuel. Additionally, dosing could occur at a different location from that illustrated. For example, a fuel-rich setting could be provided by appropriate activation of injectors (not shown) that provide fuel to the engine in such a manner that engine 12 produces exhaust including a controlled amount of un-combusted (or incompletely combusted) fuel (in-cylinder dosing). Doser 52 is in fluid communication with a fuel line coupled to the same or a different fuel source (not shown) than that used to fuel engine 12 and is also connected with the ECU 28, which controls operation of the doser 52.

The system 10 also includes a number of sensors and sensing systems for providing the ECU 28 with information relating to the system 10. An engine speed sensor 56 may be included in or associated with the engine 12 and is connected with the ECU 28. The engine speed sensor 56 is operable to produce an engine speed signal indicative of engine rotation speed ("RPM") that is provided to the ECU 28. A pressure sensor 58 may be connected with-the exhaust conduit 54 for measuring the pressure of the exhaust before it enters the exhaust filtration system 14. The pressure sensor 58 may be connected with the ECU 28. If pressure becomes too high, this may indicate that a problem exists with the exhaust filtration system 14, which may be communicated to the ECU 28.

At least one temperature sensor 60 may be connected with the DOC unit 16 for measuring the temperature of the exhaust gas as it enters the DOC unit 16. In other embodiments, two temperature sensors 60 may be used, one at the entrance or upstream from the DOC unit 16 and another at the exit or downstream from the DOC unit 60. These temperature sensors are used to calculate the temperature of the DOC unit 16. In this alternative, an average temperature may be determined, using an algorithm, from the two respective temperature readings of the temperature sensors 60 to arrive at an operating temperature of the DOC unit 60.

Figure 2:
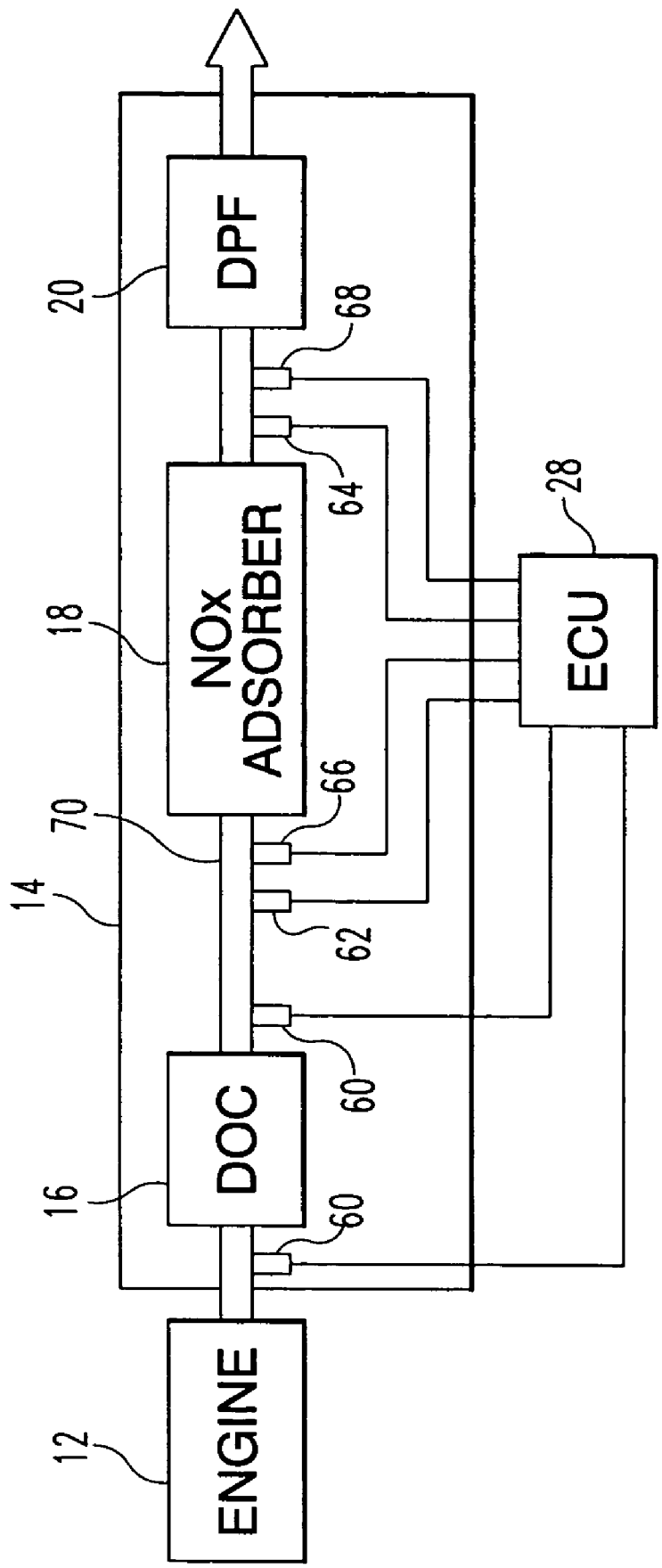
FIG. 2 is a more detailed schematic of the exhaust system of the representative diesel engine system.

Referring to FIG. 2, a more detailed diagram of the exhaust filtration system 14 is depicted connected in fluid communication with the flow of exhaust leaving the engine 12. A first $NO_x$ temperature sensor 62 may be in fluid communication with the flow of exhaust gas before entering or upstream of the $NO_x$ adsorber 18 and is connected to the ECU 28. A second $NO_x$ temperature sensor 64 may be in fluid communication with the flow of exhaust gas exiting or downstream of the $NO_x$ adsorber 18 and is also connected to the ECU 28. The $NO_x$ temperature sensors 62, 64 are used to monitor the temperature of the flow of gas entering and exiting the $NO_x$ adsorber 18 and provide electric signals that are indicative of the temperature of the flow of exhaust gas to the ECU 28. An algorithm may then be used by the ECU 28 to determine the operating temperature of the $NO_x$ adsorber 18.

A first universal exhaust gas oxygen ("UEGO") sensor or lambda sensor 66 may be positioned in fluid communication with the flow of exhaust gas entering or upstream from the $NO_x$ adsorber 18 and a second UEGO sensor 68 may be positioned in fluid communication with the flow of exhaust gas exiting or downstream of the $NO_x$ adsorber 18. The UEGO sensors 66, 68 are connected with the ECU 28 and generate electric signals that are indicative of the amount of oxygen contained in the flow of exhaust gas. The UEGO sensors 66, 68 allow the ECU 28 to accurately monitor air-fuel ratios ("AFR") also over a wide range thereby allowing the ECU 28 to determine a lambda value associated with the exhaust gas entering and exiting the $NO_x$ adsorber 18.

Referring back to FIG. 1, an ambient pressure sensor 72 and an ambient temperature sensor 74 may be connected with the ECU 28. The ambient pressure sensor 72 is utilized to obtain an atmospheric pressure reading that is provided to the ECU 28. As known in the art, as elevation increases, there are exponentially fewer and fewer air molecules. Therefore, atmospheric pressure decreases with increasing altitude at a decreasing rate. The ambient temperature sensor 74 is utilized to provide the ECU 28 with a reading indicative of the outside temperature or ambient temperature. As set forth in greater detail below, when the engine 12 is operating outside of calibrated ambient conditions (i.e.—above or below sea level and at ambient temperatures outside of approximately 60-80° F.) the present invention may utilize a closed-loop control module to maintain the bed temperature of the $NO_x$ adsorber 18 at the preferred regeneration temperature value (e.g. –650° C.).

Figure 3:
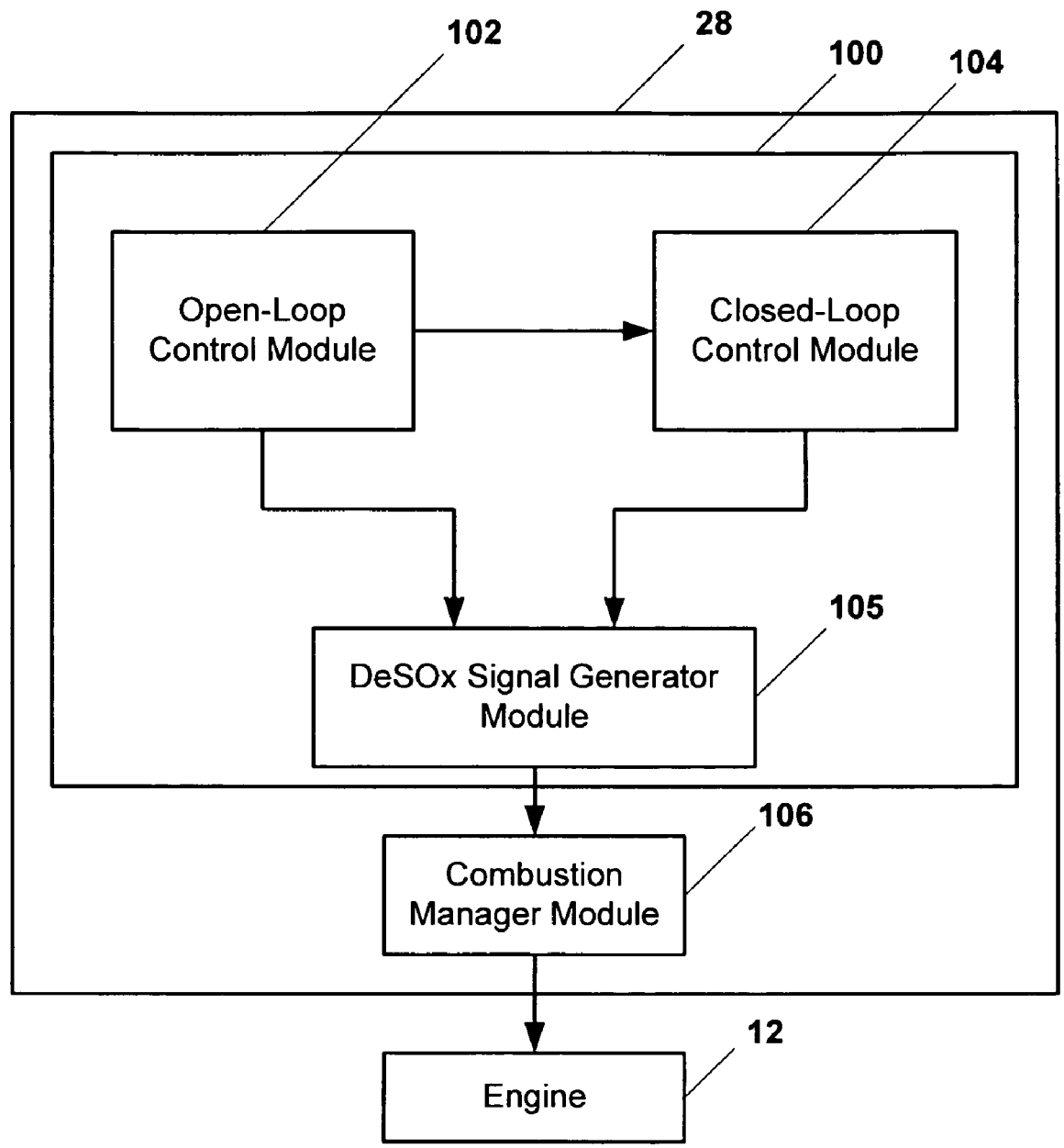
FIG. 3 is a block diagram of an after-treatment manager module executable by the ECU.

Referring to FIG. 3, the system 10 includes an after-treatment manager module or software routine 100 and a combustion manager module or software routine 102 that are executable by the ECU 28. The after-treatment manager module 100 is responsible for, amongst other things, desulfation of the $NO_x$ adsorber 18. After a predetermined period of engine operation, the $NO_x$ adsorber 18 requires regeneration to remove sulfur that builds up on or is trapped by the $NO_x$ adsorber 18. The after-treatment manager module 100 uses engine management to control the air fuel ratio at the inlet 70 of the $NO_x$ adsorber 18 with lean/rich cycling to provide reductant to regenerate sulfur that has been captured or trapped by the $NO_x$ adsorber 18.

Figure 4:
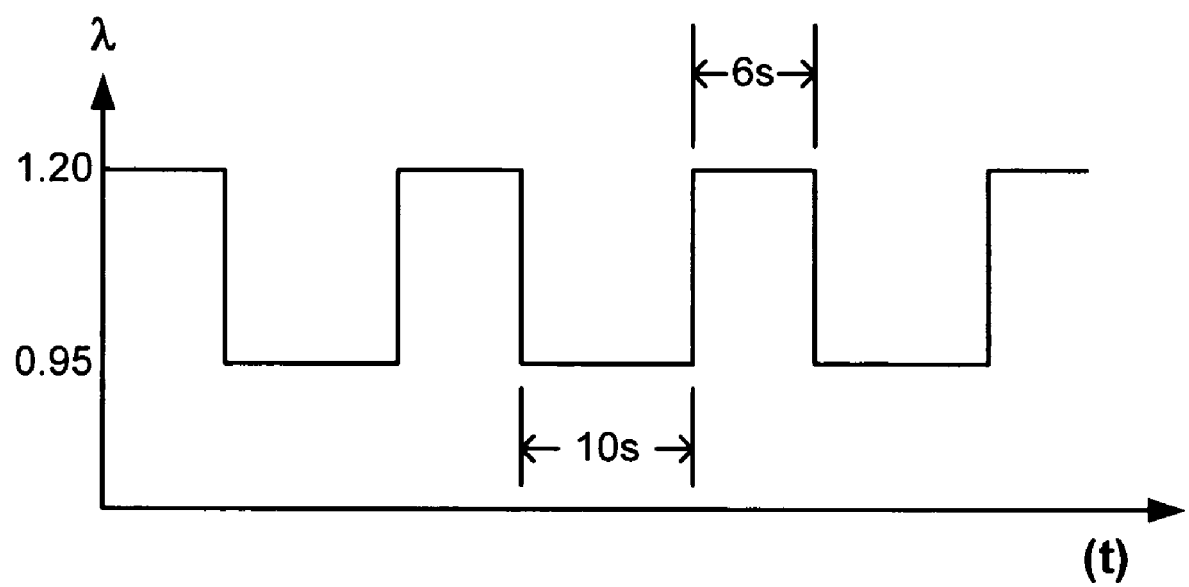
FIG. 4 illustrates control of a duty cycle variable in which the exhaust entering an inlet of an adsorber is selectively controlled between a lean and rich air fuel ratio.

As set forth above, the after-treatment manager module 100 controls the engine 12 such that the air fuel ratio value or exhaust lambda value at the inlet 70 of the $NO_x$ adsorber 18 is selectively cycled to provide reductant to regenerate the $NO_x$ adsorber 18. At the inlet 70, the exhaust lambda is controlled through engine management to switch at a controlled frequency between lean and rich lambda values. Referring to FIG. 4, in one embodiment, the exhaust lambda has a lean lambda target value of approximately 1.20 and a rich lambda target value of approximately 0.95. As illustrated and set forth in greater detail below, the after-treatment manager module 100 controls the duty cycle of the exhaust lambda at the inlet 70 of the $NO_x$ adsorber 18 to a lean lambda value for a first predetermined period of time and a rich lambda value for a second predetermined period of time. The UEGO sensor 66 at the inlet 70 of the $NO_x$ adsorber 18 is used by the ECU 28 to monitor the exhaust lambda value.

The after-treatment management module 100 includes an open-loop control module 102, a closed-loop control module 104, and a signal generator module 105. The open-loop control module 102 is used to ramp up the temperature of the $NO_x$ adsorber 18 to a regeneration temperature, which is preferentially approximately 650° C., by controlling the air fuel ratio at the inlet 70 of the $NO_x$ adsorber 18 to operate at a variable duty cycle. If the engine 12 is operating in calibrated ambient conditions (i.e., at approximately sea level and between 60-80 degrees Fahrenheit.), the open-loop control module 102 is capable of maintaining the $NO_x$ adsorber 18 at the regeneration temperature.

The closed-loop control module 104 is also utilized to maintain the $NO_x$ adsorber 18 at the regeneration temperature value by controlling the air fuel ratio at the inlet 70 of the $NO_x$ adsorber 18 to operate at a second variable duty cycle. However, the closed-loop control module 104 takes control from the open-loop control module 102 if the temperature of the $NO_x$ adsorber 18 deviates a predetermined amount from the regeneration temperature. This typically occurs when the engine 12 is operating outside of calibrated ambient conditions. As such, the open-loop control module 102 is utilized to rapidly heat the $NO_x$ adsorber 18 to the regeneration temperature and maintain the $NO_x$ adsorber 18 at the regeneration temperature in calibrated ambient conditions. The closed-loop control module 104 is utilized to maintain the $NO_x$ adsorber 18 at the regeneration temperature once the open-loop control module 102 can no longer maintain the $NO_x$ adsorber 18 at the regeneration temperature due to various operating condition changes.

The signal generator module 105 is used to generate a lean indication and a rich indication that is used by the combustion manager module 106 to control the engine 12 to operate in either a lean mode or a rich mode. The lean mode causes exhaust gas to enter the inlet 70 of the $NO_x$ adsorber 18 at the predetermined lean value, which is equal to a lambda value of approximately 1.20 in one embodiment. The rich mode causes exhaust gas to enter the inlet of the $NO_x$ adsorber 18 at a predetermined rich value, which is equal to a lambda value of approximately 0.95 in one embodiment. In one embodiment, the lean indication comprises a logic state indication of zero ("0") and the rich indication comprises a logic state of one ("1"). Thus, the signal generator module 105 is operable to cycle between logic states at predetermined time intervals, thereby causing the combustion manager module 106 to controllably vary operation of the engine 12 between the lean mode and rich mode.

The after-treatment manager module 100 is connected or associated with a combustion manager module 106. Although beyond the scope of the present invention, the combustion manager module 106 is utilized to implement an engine management strategy that modulates mass air flow provided through the intake throttle valve 26, re-circulated air flow from the EGR system 40, main fuel injection from the fuel system 34, and post injection quantity, timing and rail pressure of the fuel system 34, to deliver an accurate air fuel ratio at the inlet 70 of the $NO_x$ adsorber 18. As such, the combustion manager module 106 is capable of delivering exhaust from the engine 12 to the inlet 70 of the $NO_x$ adsorber 18 that meets the lean/rich lambda target requirements set by the after-treatment manager module 100. The ECU 28, via the combustion manager module 106, is therefore capable of controlling the engine 12 to meet the lean/rich lambda target requirements.

In order to achieve effective desulfation of the $NO_x$ adsorber 18, a bed temperature of the $NO_x$ adsorber 18 shall be controlled at approximately 650° C. in addition to meeting the air fuel ratio requirements at the inlet 70 of the $NO_x$ adsorber 18. In principle, in one embodiment, rich lambda control is fixed at approximately 0.95 to provide hydrocarbon ("HC") reductant for desulfation of the $NO_x$ adsorber 18. When the exhaust is controlled at the lean target, oxygen burns unburned HC to increase the bed temperature of the $NO_x$ adsorber 18. As such, the most important leverage to control the bed temperature of the $NO_x$ adsorber 18 during regeneration is to modulate the lean/rich duty cycle frequency.

Figure 5:
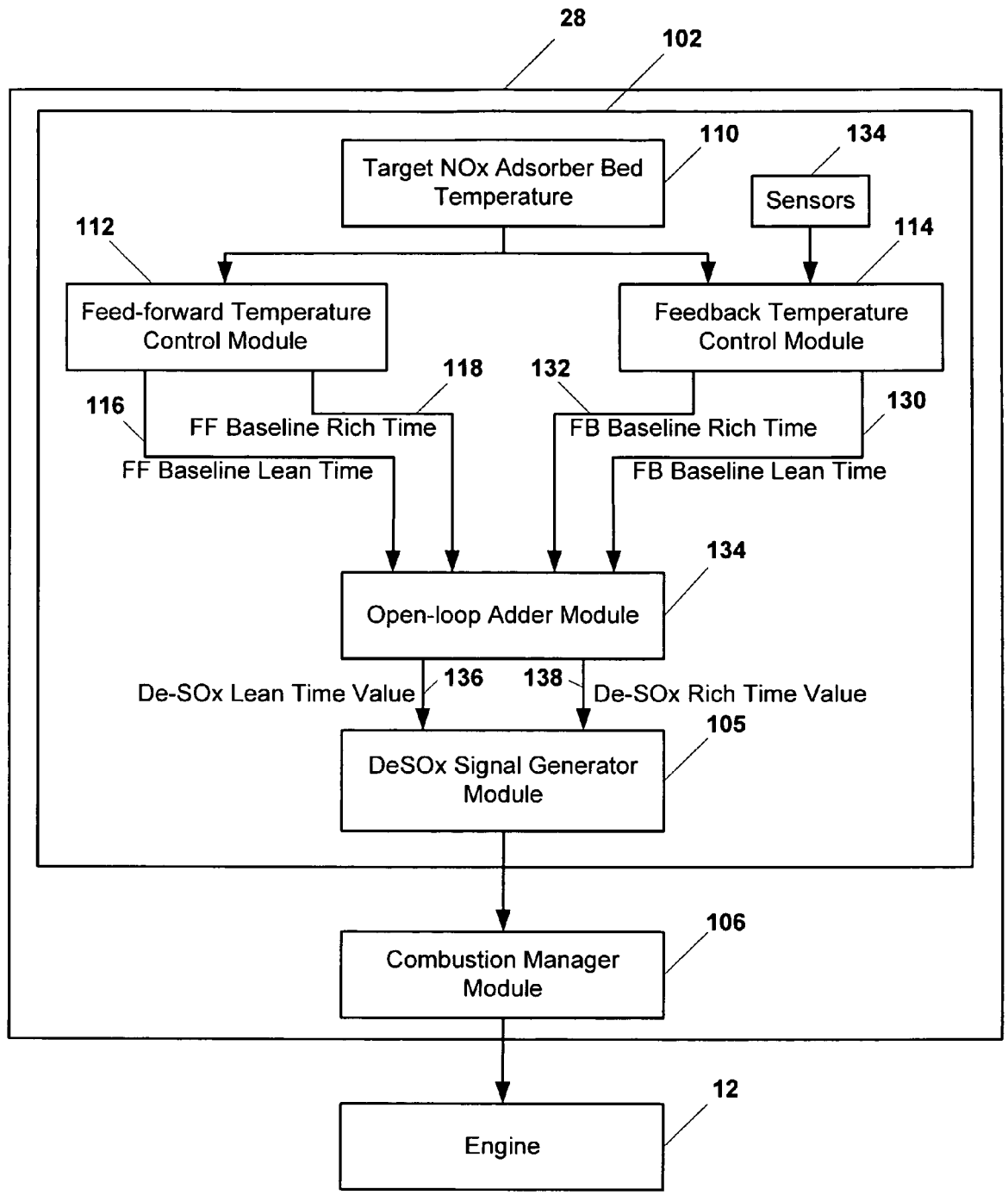
FIG. 5 is a block diagram of an open-loop control module executable by the ECU.

Referring to FIG. 5, the open-loop control module 102 that is executable by the ECU 28 is illustrated in greater detail. The open-loop control module 102 may include a target $NO_x$ adsorber bed temperature value or setting 110. As previously set forth, in one embodiment, the target $NO_x$ adsorber bed temperature value 110 is approximately 650° C., but may vary in alternative embodiments of the present invention. The target $NO_x$ adsorber bed temperature value 110 is utilized as in input to a feed-forward temperature control module 112 and a feedback temperature control module 114, the functionality of which are set forth in detail below.

Figure 6:
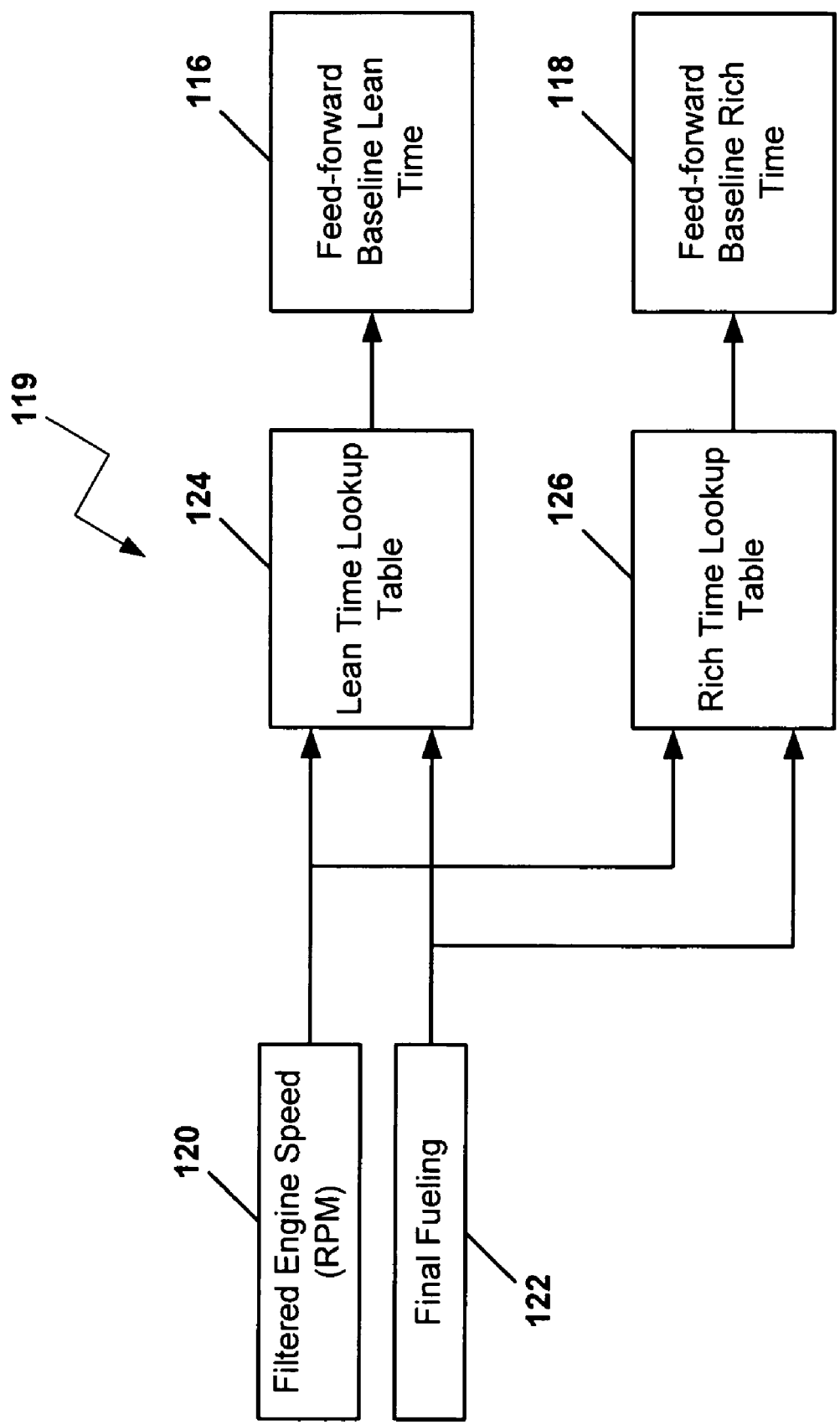
FIG. 6 is a block diagram of an engine map used by a feed-forward temperature control module.

The feed-forward temperature control module 112 is operable to generate a feed-forward baseline lean time value 116 and a feed-forward baseline rich time value 118. Referring to FIG. 6, the feed-forward baseline lean time value 116 and the feed-forward baseline rich time value 118 are defined as a function of an engine map 119. The feed-forward temperature control module 112 uses an engine speed value 120, such as revolutions per minute ("RPM") which may be obtained from speed sensor 56, and a final fueling value 122 as inputs to a lean time lookup table 124 and a rich time lookup table 126. The final fueling value is tracked by the combustion manager module 106. The lean time lookup table 124 and the rich time lookup table 126 use the engine speed value 120 and the final fueling value 122 to lookup a predetermined feed-forward baseline lean time value 116 and feed-forward baseline rich time value 118 as a function of the engine speed value 120 and the final fueling value 118. These respective values 116, 118 are determined through testing and calibration of the engine 12.

As set forth in greater detail below, the lean time lookup table 124 and the rich time lookup table 126 are calibrated at steady state nominal engine operating conditions such that the bed temperature of the $NO_x$ adsorber 18 is controlled at around 650° C. at approximately sea level with an ambient temperature between approximately 60-80° F. When engine operating conditions change, the open-loop control module 102 may no longer be able to control the bed temperature of the $NO_x$ adsorber 18 at approximately 650° C. As such, the closed-loop control module 104 takes over if the regeneration temperature starts to deviate and is used to control the bed temperature of the $NO_x$ adsorber 18 at the regeneration temperature.

Referring back to FIG. 5, the feedback temperature control module 114 is operable to generate a feedback baseline lean time value 130 and a feedback baseline rich time value 132 as a function of the target $NO_x$ adsorber bed temperature value 110 and one or more engine operating parameters that are received from a broad range of sensors 134. In one embodiment, the sensors 134 comprise the first and second $NO_x$ temperature sensors 62, 64, which are utilized to provide the ECU 28 with an indication of the temperature of the bed of the $NO_x$ adsorber 18. As such, in this embodiment, the feedback temperature control module 114 utilizes the actual temperature of the $NO_x$ adsorber 18 and the target $NO_x$ adsorber bed temperature value 110 to generate the feedback baseline lean time value 130 and the feedback baseline lean time value 132. The feedback baseline lean time value 130 and the feedback baseline lean time value 132 are generated based on feedback from the system 10 and the target $NO_x$ adsorber bed temperature value 110. The feedback temperature control module 114 includes an algorithm or model that generates the feedback baseline lean time value 130 and the feedback baseline lean time value 132 based on various inputs as set forth above.

As illustrated in FIG. 5, the feed-forward baseline lean time value 116, the feed-forward baseline rich time value 118, the feedback baseline lean time value 130 and the feedback baseline lean time value 132 are provided as inputs to an open-loop adder module 134. The open-loop adder module 134 uses the feed-forward baseline lean time value 116 and the feedback baseline lean time value 130 to generate a lean time value 136. In addition, the open-loop adder module 134 uses the feed-forward rich time value 118 and the feedback rich time value 132 to generate a rich time value 138.

In one embodiment, the open-loop adder module 134 combines and then averages the inputs to arrive at the lean time value 136 and the rich time value 138. For illustrative purposes only, if the feed-forward baseline lean time value 116 is ten ("10") seconds and the feedback baseline lean time value 130 is eight ("8") seconds, the open-loop adder module 134 will generate a lean time value 136 of nine ("9") seconds. Likewise, if the feed-forward baseline rich time value 118 is six ("6") seconds and the feedback baseline rich time value 132 is four ("4") seconds, the open-loop adder module 134 will generate a rich time value 138 of five ("5") seconds. In another embodiment, the open-loop adder module 134 may use an algorithm to generate the lean and rich time values 136, 138.

As further illustrated in FIG. 5, the open-loop control module 102 includes a signal generator module 105. The signal generator 105 is used to generate a duty cycle variable. In one embodiment, when the duty cycle variable is equal to one ("1"), the air fuel ratio at the inlet 70 of the $NO_x$ adsorber 18 is controlled at the rich lambda value of approximately 0.95. When the duty cycle variable is equal to zero ("0"), the air fuel ration at the inlet 70 of the $NO_x$ adsorber 18 is controlled at the lean lambda value of approximately 1.2. As such, the duty cycle frequency of the duty cycle variable is modulated such that the bed temperature of the $NO_x$ adsorber 18 is ramped up and controlled at the preferred regeneration temperature by the open-loop control module 102. The combustion management module 106 monitors the duty cycle variable to determine how to control the engine 12 such that the exhaust introduced to the inlet 70 of the $NO_x$ adsorber 18 is controlled at the target lean/rich lambda values (i.e.—lean target lambda value≈1.2 and rich target lambda value≈0.95).

Figure 7:
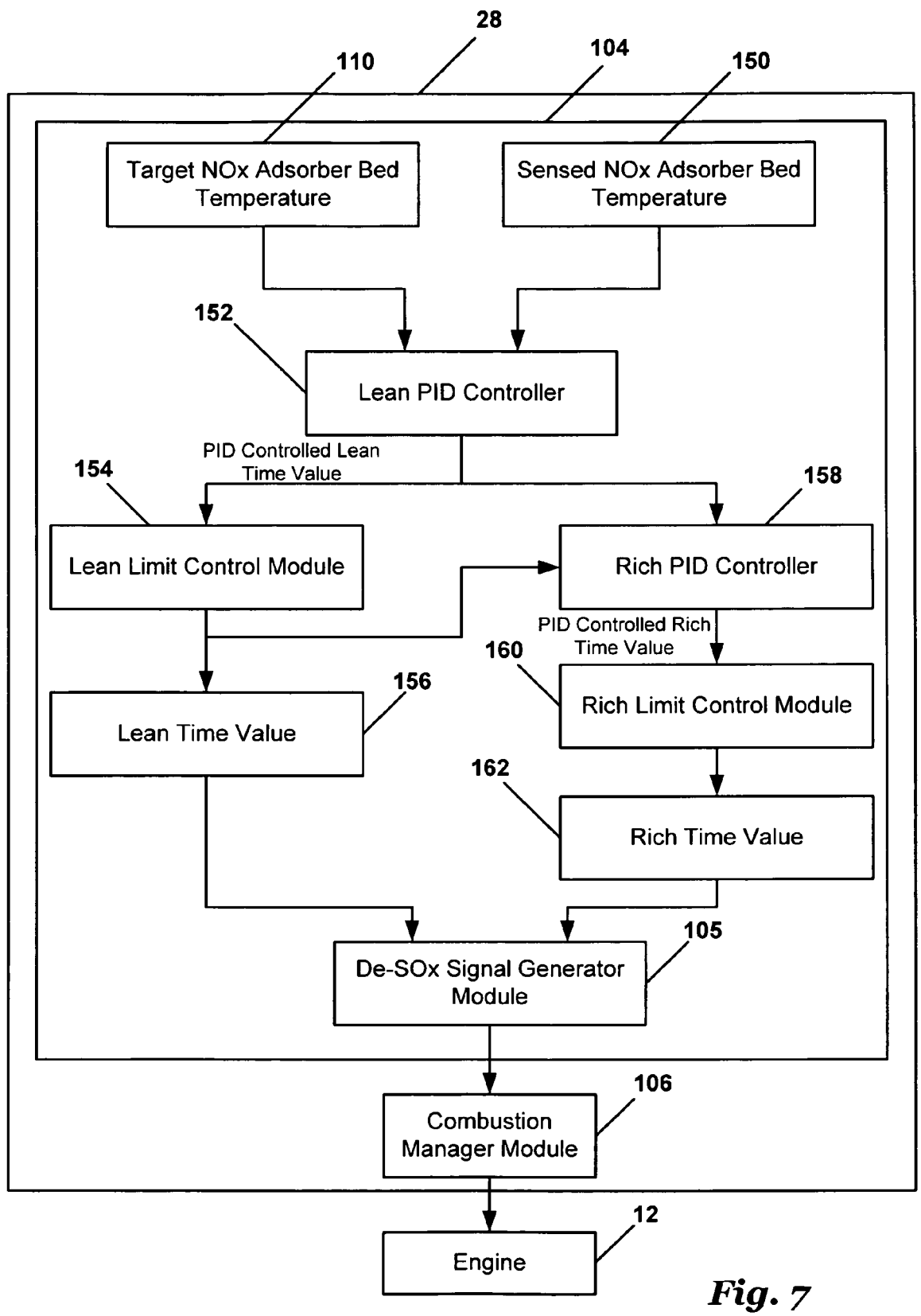
FIG. 7 is a block diagram of a closed-loop control module executable by the ECU.

Referring to FIG. 7, as previously set forth, the after-treatment manager module 100 includes the closed-loop control module 104. As set forth above, the lean time lookup table 124 and the rich time lookup table 126 of the open-loop control module 102 may not be able to maintain the $NO_x$ adsorber 18 at the preferred regeneration temperature if the engine 12 is operated outside of calibrated ambient conditions (i.e.—above or below sea level and in ambient temperatures outside of between 60-80° F.). If the temperature of the bed of the $NO_x$ adsorber 18 deviates from the temperature target, the lean time value 136 and rich time value 138 are modified and controlled by the closed-loop control module 104 such that the bed of the $NO_x$ adsorber 18 tracks the target regeneration temperature regardless of operating conditions and ambient condition changes. As such, the closed-loop control module 104 takes over control from the open-loop control module 102 in these operating conditions.

The closed-loop control module 104 uses as inputs the target $NO_x$ adsorber bed temperature value 110 and a sensed $NO_x$ adsorber bed temperature value 150. The sensed $NO_x$ adsorber bed temperature value 150 is obtained by the ECU 28 from the first and second $NO_x$ adsorber temperature sensors 62, 64. The target $NO_x$ adsorber bed temperature value 110 and the sensed $NO_x$ adsorber bed temperature value 150 are provided as inputs to a lean proportional-integral-derivative controller ("PID controller") 152. The lean PID controller 152 compares the sensed $NO_x$ adsorber bed temperature value 150 with the target $NO_x$ adsorber bed temperature value 110. The difference (or "error" signal) is then used by the lean PID controller 152 to calculate a new PID controlled lean time value that is designed to bring the temperature of the $NO_x$ adsorber 18 back to the desired regeneration value.

A lean limit control module 154 may be included to ensure that the lean time value 156 calculated by the lean PID controller 152 does not exceed or go below a predetermined threshold value. If the lean time value 156 exceeds or goes below the predetermined threshold value, the lean limit control module 154 sets the lean time value 156 equal to a calibrated maximum or minimum lean time value. As illustrated, the lean time value 156 is then provided to and utilized by the signal generator module 105 to control the time at which the engine 12 provides lean exhaust to the $NO_x$ adsorber 18. As previously set forth, lean exhaust causes unburned HC to burn thereby increasing the temperature of the $NO_x$ adsorber 18.

The closed-loop control module 104 may also include a rich PID control module 158. The rich PID controller 158 receives as inputs the PID controlled lean time value generated by the lean PID controller 152 and the lean time value 156. As previously set forth, the lean time value 156 may be modified by the lean limit control module 154 and as such, this value is provided as an input to the rich PID controller 158. The rich PID controller 158 is operable to generate a PID controlled rich time value that is provided as an input to a rich limit control module 160. The rich PID controller 158 generates the PID controlled rich time value as a function of the PID controlled lean time value and the lean time value 156.

The rich limit control module 160 is used to ensure that the PID controlled lean time value does not exceed or go below a predetermined threshold value. If the PID controlled lean time value goes below or exceeds the predetermined threshold value, the rich limit control module 160 either increases or reduces the PID controlled lean time value to a predetermined time interval. If the PID controlled lean time value is within proper parameters, the rich limit control module 160 does not modify the PID controlled lean time value. The output of the rich limit control module 160 is a rich time value 162 that is passed to the signal generator module 105. As previously set forth in detail, the signal generator module 105 generates signals that cause the combustion manager module 106 to control the engine 12 to provide exhaust at the inlet 70 of the $NO_x$ adsorber 18 at a rich lambda value.

In alternative embodiments of the present invention some of the modules described herein may be replaced by electronic circuits, which may include analog and digital circuitry. In other embodiments, the modules may comprise a combination of electronic circuits and microprocessor based components. For example, the signal generator module 105 may comprise a pair of timers. As such, the use of the term module herein should be broadly construed to include one or more of these combinations as well as software designed to provide the functionality described herein.

While the invention has been illustrated and described in detail in the drawings and foregoing description, the same is to be considered as illustrative and not restrictive in character, it being understood that only the preferred embodiments have been shown and described and that all changes and modifications that come within the spirit of the inventions are desired to be protected. It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. A system, comprising:
an open-loop control module for ramping up and maintaining a temperature value of an adsorber at a regeneration temperature value by controlling an air fuel ratio value of an engine to operate at an open-loop controlled variable duty cycle when said engine is operating within a predetermined calibrated ambient condition; and
a closed-loop control module for taking control from said open-loop control module to maintain said adsorber at said regeneration temperature value if said temperature value of said adsorber deviates from said regeneration temperature value by controlling said air fuel ratio value of said engine to operate at a closed-loop controlled variable duty cycle when said engine is operating outside said predetermined calibrated ambient condition, wherein said closed-loop control module includes a lean PID controller for generating a PID controlled lean time value as a function of a target adsorber temperature value and a sensed adsorber temperature value.

2. The system of claim 1, wherein said open-loop and closed-loop controlled variable duty cycles controllably cycle said engine to operate at a lean air fuel value for a first predetermined period of time and a rich air fuel value for a second predetermined period of time.

3. The system of claim 1, wherein said open-loop control module includes a feed-forward control module for generating a forward looking baseline lean time value and a forward looking baseline rich time value.

4. The system of claim 3, wherein said open-loop control module further includes a feedback temperature control module for generating a feedback baseline lean time value and a feedback baseline rich time value as a function of engine operating parameters.

5. The system of claim 4, wherein said open-loop control module further includes an adder module for receiving said forward looking baseline lean time value, said forward looking baseline rich time value, said feedback baseline lean time value, and said feedback baseline rich time value to generate a lean time value and a rich time value.

6. The system of claim 5, wherein said open-loop control module further includes a signal generator module for generating a lean time indication as a function of said lean time value and a rich time indication as a function of said rich time value.

7. The system of claim 6, further comprising a combustion manager module for controlling said engine to generate an air fuel ratio value at an inlet of said adsorber at a predetermined rich lambda value when said signal generator module generates said rich time indication and at a predetermined lean lambda value when said signal generator module generates said lean time indication.

8. The system of claim 1, wherein said closed-loop control module includes a rich PID controller for generating a PID controlled rich time value as a function of said PID controlled lean time value.

9. The system of claim 8, wherein said closed-loop control module includes a lean limit control module and a rich limit control module for limiting said PID controlled lean time value and said PID controlled rich time value if said PID controlled lean time value and said PID controlled rich time value exceed a predetermined threshold.

10. The system of claim 1, wherein said PID controlled lean time value and said PID controlled rich time value are used by a combustion manager module to controllably vary said closed-loop controlled variable duty cycle.

11. A method, comprising:
ramping up and maintaining an adsorber at a regeneration temperature value using an open-loop control module that controllably varies an engine to operate in a lean mode and a rich mode at a open-loop controlled duty cycle when said engine is operating within a calibrated ambient condition; and
transferring control from said open-loop control module to a closed-loop control module if a sensed temperature value of said adsorber deviates from said regeneration temperature value when said engine is operating outside said calibrated ambient condition, wherein said closed-loop control module includes a lean PID controller for generating a PID controlled lean time value as a function of a target adsorber temperature value and a sensed adsorber temperature value.

12. The method of claim 11, wherein when said engine is operating in said lean mode exhaust gas is provided to an inlet of said adsorber at a target lean lambda value.

13. The method of claim 12, wherein said target lean lambda value is approximately 1.2.

14. The method of claim 11, wherein when said engine is operating in said rich mode exhaust gas is provided to an inlet of said adsorber at a target rich lambda value.

15. The method of claim 14, wherein said target rich lambda value is approximately 0.95.

16. The method of claim 11, wherein said open-loop control module utilizes an engine map and a feedback reading to generate a lean time value and a rich time value.

17. A system, comprising:
a feed-forward temperature control module for generating a forward looking baseline lean time value and a forward looking baseline rich time value;
a feedback temperature control module for generating a feedback baseline lean time value and a feedback rich time value;
an adder for receiving said forward looking baseline lean time value, said forward looking baseline rich time value, said feedback baseline lean time value, and said feedback rich time value to generate a lean time value and a rich time value;
a signal generator for generating a lean time indication as a function of said lean time value and a rich time indication as a function of said rich time value; and
a combustion manager module for controlling an engine to output an air fuel ratio value at an inlet of an adsorber at a lean lambda value when said signal generator generates said lean time indication and at a rich value when said signal generator generates said lean time indication such that said adsorber reaches a predetermined regeneration temperature value.

18. The system of claim 17, wherein said forward looking baseline lean time value and said forward looking baseline rich time value are generated as a function of an engine map.

19. The system of claim 18, wherein said engine map generates said forward looking baseline lean time value as a function of a measured engine speed value and a fueling value.

20. The system of claim 19, wherein said engine map comprises a lookup table that is used to generate said forward looking baseline lean time value based on said measured engine speed value and said fueling value.

21. The system of claim 17, wherein said predetermined regeneration temperature value is approximately 650° C.

22. The system of claim 17, wherein said lean lambda value comprises a lambda value of approximately 1.2.

23. The system of claim 17, wherein said rich lambda value comprises a lambda value of approximately 0.95.

24. The system of claim 17, further comprising a closed-loop control module for maintaining said adsorber at said predetermined regeneration temperature value if a sensed temperature value of said adsorber deviates from said predetermined regeneration temperature value.

25. The system of claim 24, wherein said closed-loop control module includes a lean PID controller for generating a lean time adjustment and a rich PID controller for generating a rich time adjustment.

26. The system of claim 25, wherein said lean time adjustment and said rich time adjustment are determined as a function of a target temperature setting and a sensed adsorber temperature value.

27. A method, comprising:
generating a feed-forward temperature control setting based on a target temperature setting for an adsorber;
generating a feedback temperature control setting based on said target temperature setting for said adsorber and a sensed temperature value associated with said adsorber;
adjusting a lean time duty cycle and a rich time duty cycle as a function of said feed-forward temperature control setting and said feedback temperature control setting; and
switching an engine to operate between a lean operating mode and a rich operating mode as a function of said lean time duty cycle and said rich time duty cycle such that said adsorber reaches a regeneration temperature value.

28. The method of claim 27, further comprising the step of switching control of said engine to a closed-loop control if a sensed temperature value of said adsorber deviates from said regeneration temperature value.

29. The method of claim 28, further comprising the step of generating said lean time duty cycle and said rich time duty cycle with said closed-loop control.

30. The method of claim 29, wherein said lean time duty cycle is generated by a lean PID controller.

31. The method of claim 30, wherein said PID controller generates said lean time duty cycle as a function of said target temperature setting and a sensed temperature value of said adsorber.

32. The method of claim 29, wherein said rich time duty cycle is generated by a rich PID controller.

33. The method of claim 32, wherein said rich PID controller generates said rich time duty cycle as a function of said lean time duty cycle.

34. The system of claim 1, wherein said predetermined calibrated ambient condition is at about sea level.

35. The system of claim 1, wherein said predetermined calibrated ambient condition is between approximately 60-80° Fahrenheit.

36. The system of claim 1, wherein said predetermined calibrated ambient condition is at about sea level and between approximately 60-80° Fahrenheit.

* * * * *